(12) United States Patent
Yang (10) Patent No.: US 7,932,979 B2
(45) Date of Patent: Apr. 26, 2011

(54) METHOD FOR FABRICATING A LIQUID CRYSTAL DISPLAY DEVICE WHEREIN THE STORAGE ELECTRODE IS SIMULTANEOUSLY FORMED WITH THE ACTIVE PATTERN

(75) Inventor: Joon Young Yang, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 125 days.

(21) Appl. No.: 11/172,076

(22) Filed: Jun. 29, 2005

(65) Prior Publication Data
US 2006/0023133 A1    Feb. 2, 2006

(30) Foreign Application Priority Data

Jul. 28, 2004    (KR) .................. 10-2004-0059382

(51) Int. Cl.
*G02F 1/1343* (2006.01)
*G02F 1/136* (2006.01)

(52) U.S. Cl. .............. 349/140; 349/38; 349/39; 349/41; 349/147

(58) Field of Classification Search .................. 349/38, 349/39, 41, 147, 148, 140
See application file for complete search history.

(56) References Cited

U.S. PATENT DOCUMENTS

| | | | | |
|---|---|---|---|---|
| 4,778,560 A * | 10/1988 | Takeda et al. | ................. | 438/158 |
| 5,742,363 A * | 4/1998 | Bae | ................. | 349/38 |
| 5,831,703 A * | 11/1998 | Nishiguchi et al. | .......... | 349/117 |
| 6,137,551 A * | 10/2000 | Jeong | ................. | 349/38 |
| 6,317,173 B1 * | 11/2001 | Jung et al. | ................. | 349/42 |
| 6,337,234 B2 * | 1/2002 | Ha et al. | ................. | 438/161 |
| 6,403,409 B1 | 6/2002 | You | | |
| 6,493,046 B1 * | 12/2002 | Ueda | ................. | 349/38 |
| 6,617,203 B2 | 9/2003 | Kim | | |
| 6,686,326 B2 * | 2/2004 | Bogdan et al. | .......... | 510/411 |
| 6,753,235 B2 | 6/2004 | So | | |
| 2001/0003657 A1 | 6/2001 | Lee | | |
| 2002/0021403 A1 * | 2/2002 | Kim et al. | ................. | 349/187 |
| 2002/0036724 A1 * | 3/2002 | Ha | ................. | 349/38 |
| 2003/0025444 A1 * | 2/2003 | Seo et al. | ................. | 313/499 |
| 2003/0197187 A1 * | 10/2003 | Kim et al. | ................. | 257/83 |
| 2004/0063254 A1 * | 4/2004 | Wang et al. | ................. | 438/149 |
| 2004/0191968 A1 * | 9/2004 | Yang | ................. | 438/151 |
| 2005/0134752 A1 * | 6/2005 | Yang et al. | ................. | 349/42 |
| 2005/0134755 A1 * | 6/2005 | Yang et al. | ................. | 349/43 |

* cited by examiner

*Primary Examiner* — David Nelms
*Assistant Examiner* — Lauren Nguyen
(74) *Attorney, Agent, or Firm* — Brinks Hofer Gilson & Lione (57) ABSTRACT

A fabrication method of an LCD includes providing a substrate having a first region and a second region; forming a storage line in the first region and an active pattern in the second region of the substrate; forming a first insulation film on the substrate; forming a gate electrode and a pixel electrode on the substrate; forming a second insulation film on the substrate; and forming a source electrode and a drain electrode, the source electrode connected to a source region via a contact hole and the drain electrode connected to a drain region through the contact hole. The fabrication method may obtain a sufficient storage capacitance with a simplified process. The number of masks used for fabrication of a thin film transistor (TFT) may be reduced.

13 Claims, 9 Drawing Sheets

METHOD FOR FABRICATING A LIQUID CRYSTAL DISPLAY DEVICE WHEREIN THE STORAGE ELECTRODE IS SIMULTANEOUSLY FORMED WITH THE ACTIVE PATTERN

PRIORITY CLAIM

This application claims the benefit of Korean Patent Application No. P2004-59382 filed in Korea on Jul. 28, 2004, which is hereby incorporated by reference.

FIELD OF THE INVENTION

The invention relates to a liquid crystal display (LCD) device, and more particularly, to an LCD device having a sufficient storage capacity and a simplified fabrication process.

DESCRIPTION OF THE RELATED ART

A flat panel display (FPD) such as an LCD replaces a conventional display using a cathode ray tube. The flat panel display is thinner and lighter than the cathode ray tube. The LCD is a display device that expresses an image by using an optical anisotropy of liquid crystal. The LCD may exhibit excellent resolution, color display and picture quality. Thus, the LCD may be frequently in use with an information processing device such as a notebook, a desktop monitor, etc.

An LCD panel includes a first substrate, a second substrate and a liquid crystal layer formed between the first and second substrates. The first substrate may be referred to as a color filter substrate because it includes R, G and B color filters. The second substrate may be referred to as an array substrate because it includes an array of thin film transistors.

As a switching device for the LCD, a thin film transistor (TFT) is commonly used. The TFT includes a channel layer which may be made from an amorphous silicon thin film or a polycrystalline silicon thin film.

In a fabricating process of the LCD device, a mask process, i.e., a photolithography process is used. The mask process is applied multiple times, so productivity may increase by reducing a number of times the mask process is applied.

Figure 1:
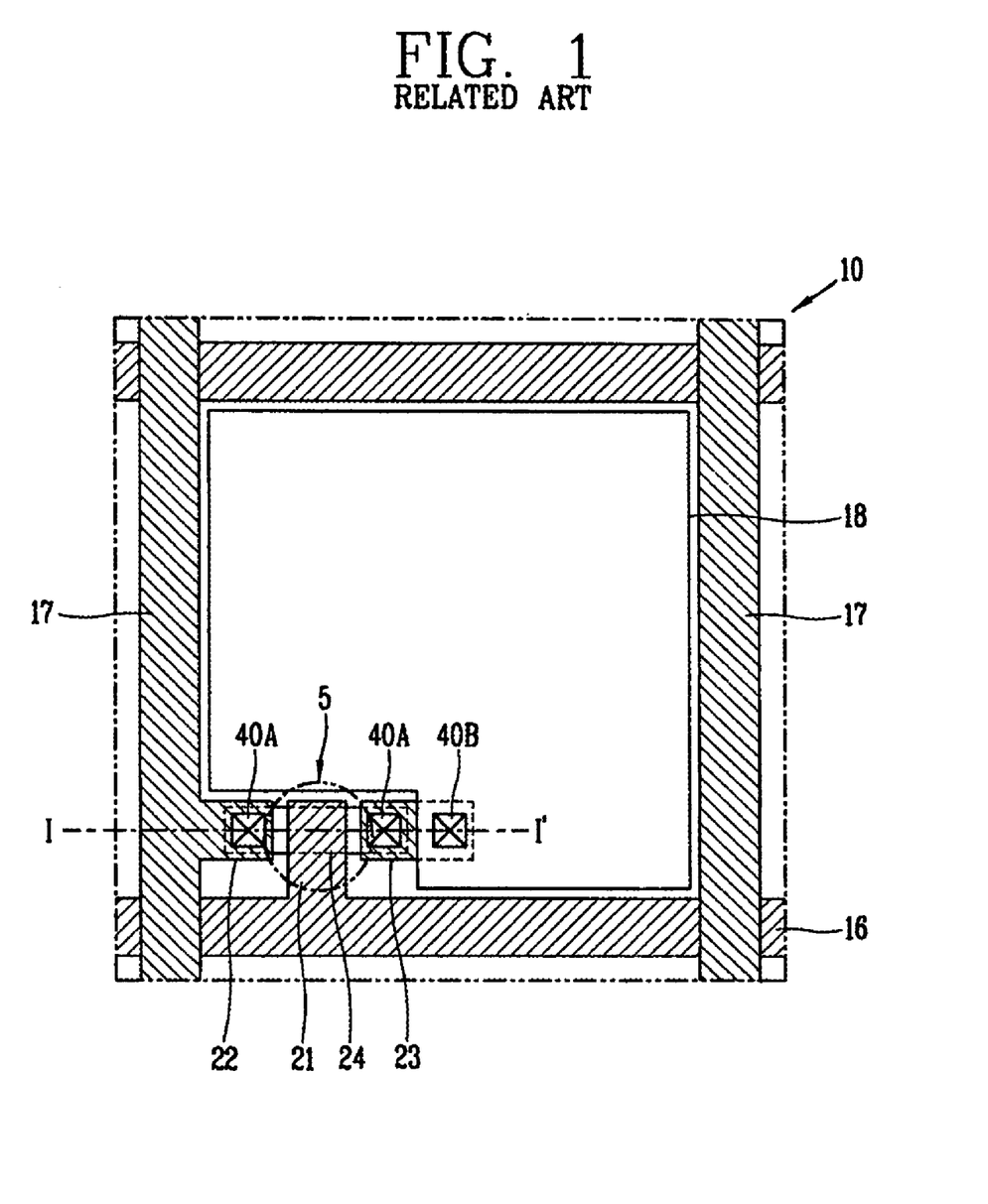
FIG. 1 is a plan view showing a portion of an array substrate of an LCD device of the related art.

FIG. 1 is a plan view showing a portion of an array substrate of an LCD device of the related art. FIG. 1 illustrates a single pixel region of the LCD device for convenience of explanation. The LCD device may include M×N number of pixels which have N number of gate lines and M number of data lines. The gate lines and the data lines intersect each other.

As shown in FIG. 1, a gate line 16 and a data line 17 are arranged vertically and horizontally on an array substrate 10. The gate line 16 and the data line 17 define a pixel region. A TFT 5 as a switching device is formed at the intersection of the gate line 16 and the data line 17. A pixel electrode 18 is formed at the pixel region.

The TFT 5 includes a gate electrode 21 connected to the gate line 16, a source electrode 22 connected to the data line 17 and a drain electrode 23 connected to the pixel electrode 18. The TFT 5 also includes a first insulation film (not shown) and a second insulation film (not shown) for insulating the gate electrode 21 and the source/drain electrodes 22 and 23, and an active pattern 24 for forming a conductive channel between the source and drain electrodes 22 and 23 by a gate voltage supplied to the gate electrode 21.

First contact holes 40A are formed at the first and second insulation films. Via the contact holes 40A, the source electrode 22 is electrically connected with a source region of the active pattern 24 and the drain electrode 23 is electrically connected with a drain region of the active pattern 24.

A third insulation film (not shown) having a second contact hole 40B is formed on the drain electrode 23, so that the drain electrode 23 and the pixel electrode 18 are electrically connected through the second contact hole 40B.

A fabrication process of the LCD device of FIG. 1 is explained with reference to FIGS. 2A to 2F. FIGS. 2A to 2F are cross sectional views of the fabrication process of the LCD device, which is taken along line I-I' of FIG. 1.

Figure 2A:
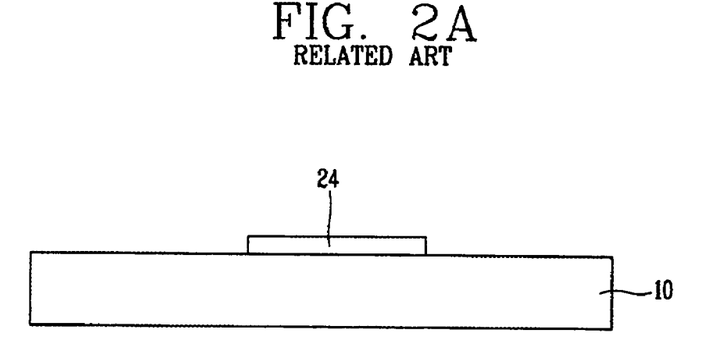
FIGS. 2A to 2F are cross sectional views showing a process of fabricating the LCD device taken along line I-I' of FIG. 1.

As shown in FIG. 2A, the active pattern 24 is formed as a polycrystalline silicon thin film on the array substrate 10 by using a photolithography process (a first mask process).

Figure 2B:
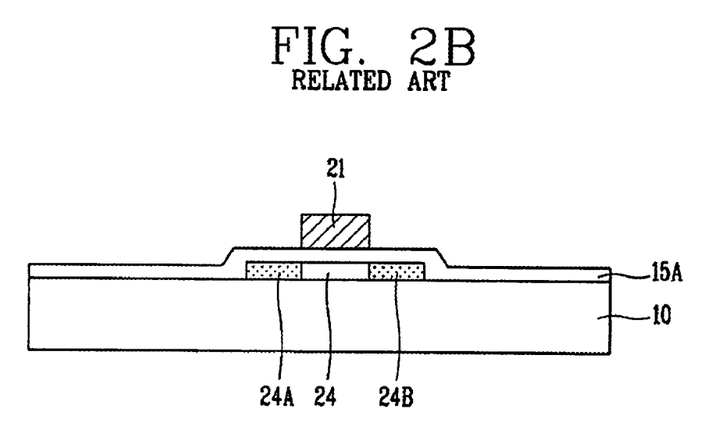

In FIG. 2B, a first insulation film 15A and a conductive metal material are sequentially deposited on the entire surface of the substrate 10 with the active pattern 24 formed thereon. Subsequently, the conductive metal material is selectively patterned by using the photolithography process (a second mask process) to form a gate electrode 21. The gate electrode 21 is formed over the active pattern 24 and the first insulation film 15A is interposed therebetween.

Source/drain regions 24A and 24B having p+ type or n+ type may be formed at certain regions of the active pattern 24 by injecting a high density impurity ion (i.e., dopant) by using the gate electrode 21 as a mask. The source/drain regions 24A and 24B are formed for an ohmic contact with source/drain electrodes, which will be described below in conjunction with FIG. 2D.

Figure 2C:
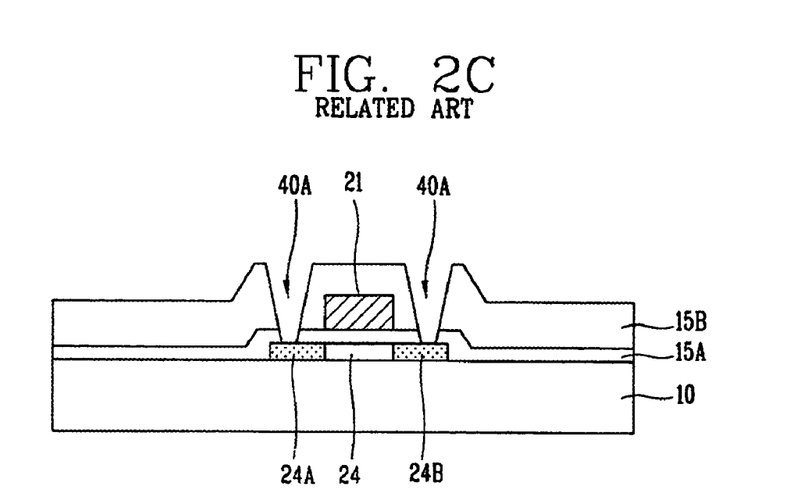

As shown in FIG. 2C, a second insulation film 15B is disposed on the entire surface of the substrate 10. A portion of the first and second insulation films 15A and 15B is removed with the photolithography (a third mask process) to form a first contact hole 40A. Via the first contact hole 40A, a portion of the source/drain regions 24A and 24B may be partially exposed.

Figure 2D:
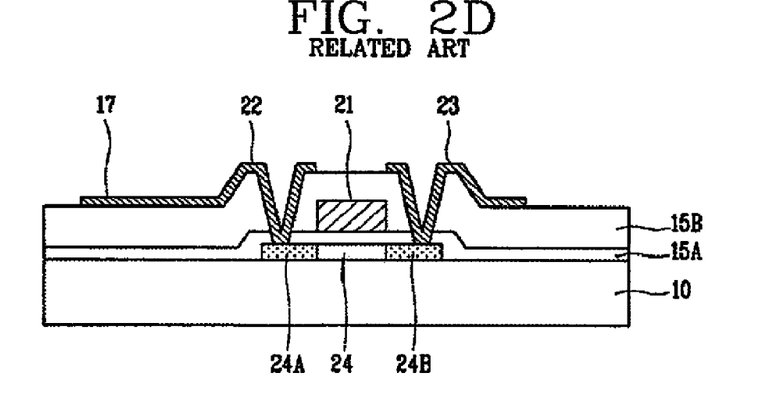

In FIG. 2D, a conductive metal material is deposited on the entire surface of the substrate 10 and then patterned by using the photolithography process (a fourth making process). A source electrode 22 is formed to be connected with the source region 24A via the first contact hole 40A and a drain electrode 23 is formed to be connected with the drain region 24B via the first contact hole 40A. In this case, a portion of the conductive metal layer constituting the source electrode 22 extends in one direction to form the data line 17.

Figure 2E:
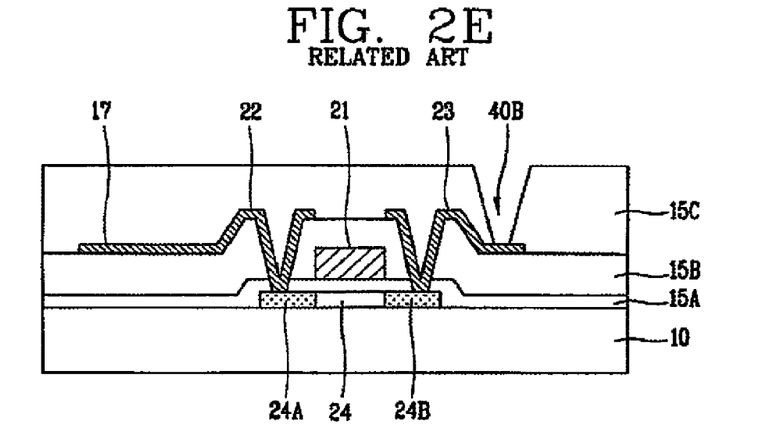

As shown in FIG. 2E, a third insulation film 15C is deposited on the entire surface of the substrate 10, and a second contact hole 40B is formed. Via the second contact hole 40B, a portion of the drain electrode 23 is exposed by using the photolithography process (a fifth mask process).

Figure 2F:
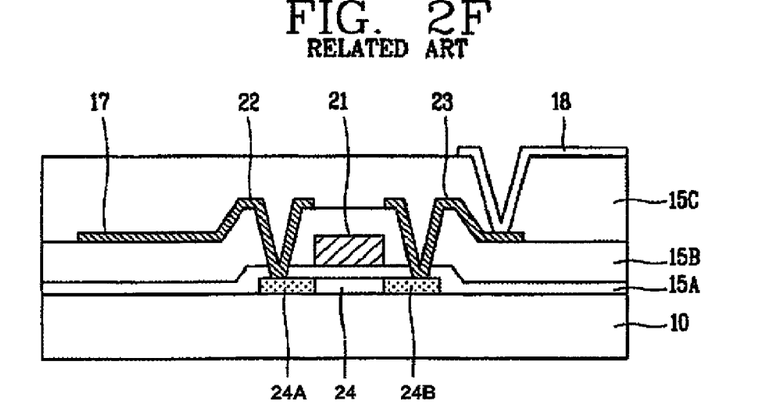

As shown in FIG. 2F, a transparent conductive metal material is deposited on the entire surface of the substrate 10 and then patterned by using the photolithography process (a sixth mask process) to form the pixel electrode 18 connected with the drain electrode 23 via the second contact hole 40B.

As noted above, total six times of the photography process are required to pattern the active pattern, the gate electrode, the first contact holes, the source/drain electrodes, the second contact hole and the pixel electrode.

The photolithography process is a process of transferring a pattern formed on a mask onto a thin film-deposited substrate to form a desired pattern, including other processes such as applying a photosensitive solution, an exposure process and a developing process. As a result, during the repetitive and excessive photolithography process, a production yield may decrease and a defective TFT may be produced. Furthermore, the mask designed to form the pattern is costly, so using a large number of masks may lead to increase fabrication expenses. Accordingly, there is a need of a LCD that overcomes drawbacks of the related art LCD and fabrication process thereof.

SUMMARY OF THE INVENTION

A method for fabricating an LCD includes providing a substrate having a first region and a second region; forming a storage line in the first region and an active pattern in the second region of the substrate; forming a first insulation film on the substrate; forming a gate electrode and a pixel electrode on the substrate; forming a second insulation film on the substrate; and forming a source electrode and a drain electrode, the source electrode connected to a source region via a contact hole and the drain electrode connected to a drain region through the contact hole.

In other embodiment, an LCD includes a substrate; an active pattern having a silicon layer; a storage line having a first conductive film; a first insulation film on the substrate; a gate electrode having second and third conductive films and a pixel electrode formed as the second conductive film. The gate electrode and the pixel electrode are simultaneously patterned. The LCD further includes a second insulation film, a source electrode and a drain electrode. The second insulation film is formed on the substrate and has a contact hole. The source electrode is connected with a source region and the drain electrode is connected with a drain region through the contact hole. The source electrode and the drain electrode are formed on the substrate.

The foregoing and other objects, features, aspects and advantages of the present invention will become more apparent from the following detailed description when taken in conjunction with the accompanying drawings.

BRIEF DESCRIPTION OF THE DRAWINGS

The accompanying drawings, which are included to provide a further understanding and are incorporated in and constitute a part of this specification, illustrate embodiments and together with the description serve to explain the principles of the invention. In the drawings.

DETAILED DESCRIPTION OF THE PREFERRED EMBODIMENTS

Figure 3:
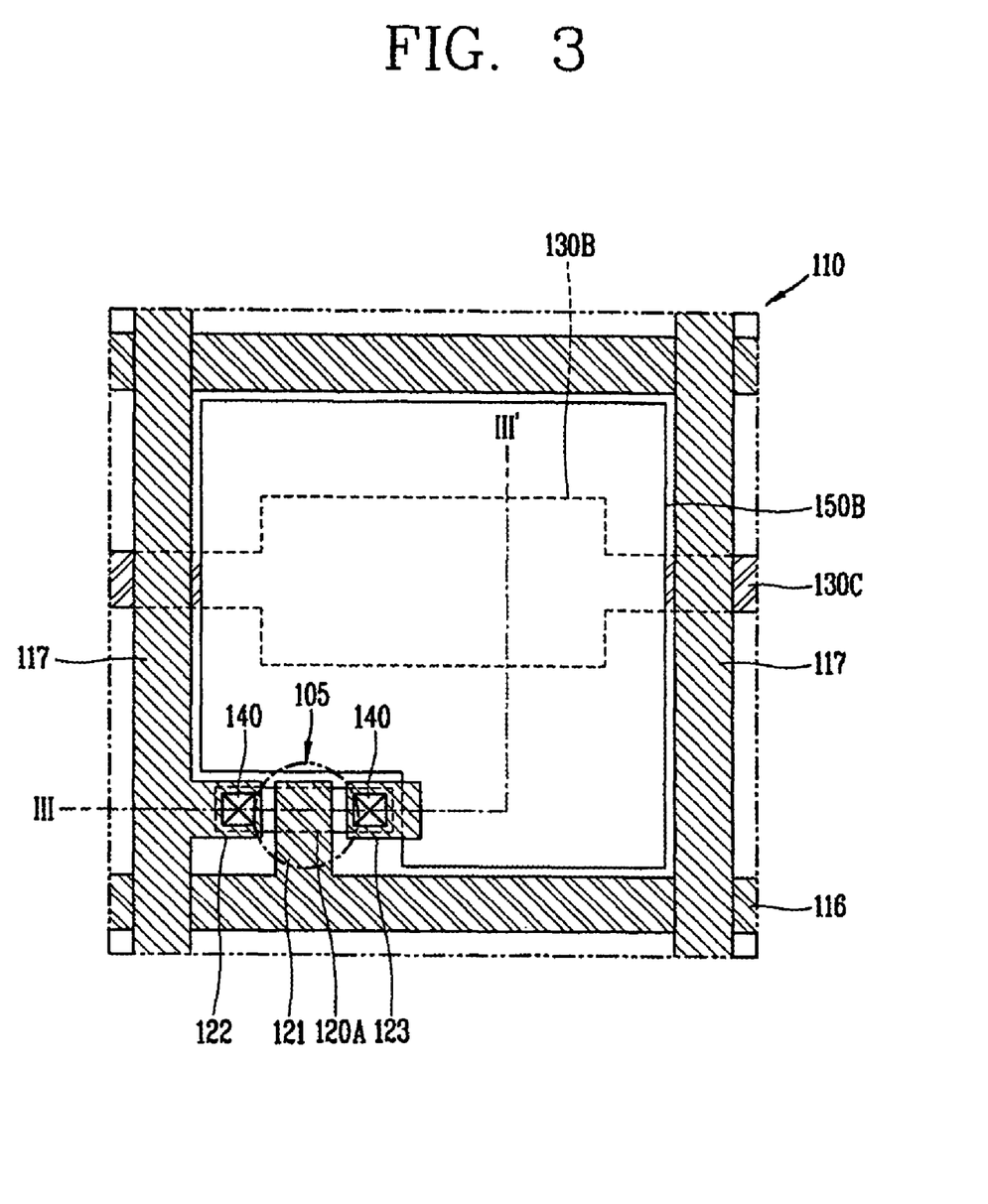
FIG. 3 is a plan view showing a portion of an array substrate of an LCD device.

FIG. 3 is a plan view showing a pixel region of an array substrate of an LCD device. For convenience of explanation, one pixel region including a thin film transistor (TFT) 105 is illustrated in FIG. 3. The LCD device may include M×N number of pixels where N number of gate lines and M number of data lines intersect each other.

In this embodiment, the TFT 105 uses a polycrystalline silicon thin film as a channel layer. In other embodiment, an amorphous silicon thin film may be used as the channel layer of the TFT 105.

In FIG. 3, a gate line 116 and a data line 117 are arranged vertically and horizontally on the array substrate 110 and configured to define the pixel region. The TFT 105 as a switching device is formed at the crossing of the gate line 116 and the data line 117, and a pixel electrode 150B connected with the TFT 105 is formed in the pixel region.

The TFT 105 includes a gate electrode 121 connected with the gate line 116, a source electrode 122 connected with the data line 117 and a drain electrode 123 connected with the pixel electrode 150B. The TFT 105 also includes first and second insulation films (not shown) for insulating the gate electrode 121 and the source/drain electrodes 122 and 123. The TFT 105 includes a first active pattern 120A for forming a conductive channel between the source electrode 122 and the drain electrode 123 in response to a gate voltage supplied to the gate electrode 121.

A portion of the source electrode 122 is electrically connected with a source region of the first active pattern 120A and a portion of the drain electrode 123 is electrically connected with a drain region of the first active pattern 120A through contact holes 140 formed at the first and second insulation films. Another portion of the source electrode 122 is connected with the data line 117 to form a portion of the data line 117 and another portion of the drain electrode 123 extends toward the pixel region to be electrically connected with the pixel electrode 150B.

As stated above, the pixel region is defined by an intersection of the gate line 116 and the data line 117, which is an image display region. The pixel electrode 150B may be made from a transparent conductive material with excellent light transmittance such as indium tin oxide (ITO).

A storage line 130C is formed in the same direction as the gate line 116. The storage line 130C overlaps with the pixel electrode 150B to constitute the storage wiring together with a first storage electrode 130B. The first storage electrode 130B forms a storage capacitor in the pixel region. In this case, the first storage electrode 130B overlaps with a portion of the pixel electrode 150B to form the storage capacitor with the first insulation film interposed therebetween.

The pixel electrode 150B of the array substrate 110 forms a liquid crystal capacitor together with the common electrode of the color filter substrate (not shown). A voltage applied to the liquid crystal capacitor is not maintained but fades away until a next signal is received. To maintain the applied voltage, the storage capacitor must be connected to the liquid crystal capacitor for use.

The storage capacitor has effects of stabilizing a gray scale display and reducing a flicker and a residual image as well as maintaining a signal. In this embodiment, the storage wiring 130B and 130C are patterned simultaneously with the active pattern 120A by using a slit mask. An additional masking process is not necessary.

The storage wirings 130B and 130C are formed as a conductive metal layer and may be applied to a line inversion driving system requesting a low resistance as well as to a dot inversion. By simultaneously forming the pixel electrode 150B and the gate electrode 121 on the same layer, the number of masks used for fabrication of the TFT may be reduced, which will be described in conjunction with FIGS. 4A to 4E.

FIGS. 4A to 4E are cross sectional views showing a process of fabricating the LCD device taken along line III-III' of FIG. 3. FIGS. 5A to 5D are plan views showing a process of fabricating the LCD device shown in FIG. 3.

Figure 4A:
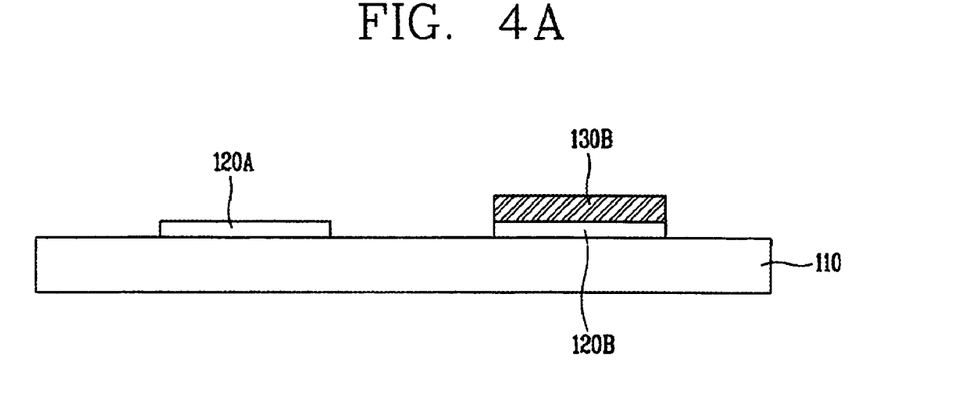
FIGS. 4A to 4E are cross sectional views showing a process of fabricating the LCD device taken along line III-III' of FIG. 3.
Figure 5A:
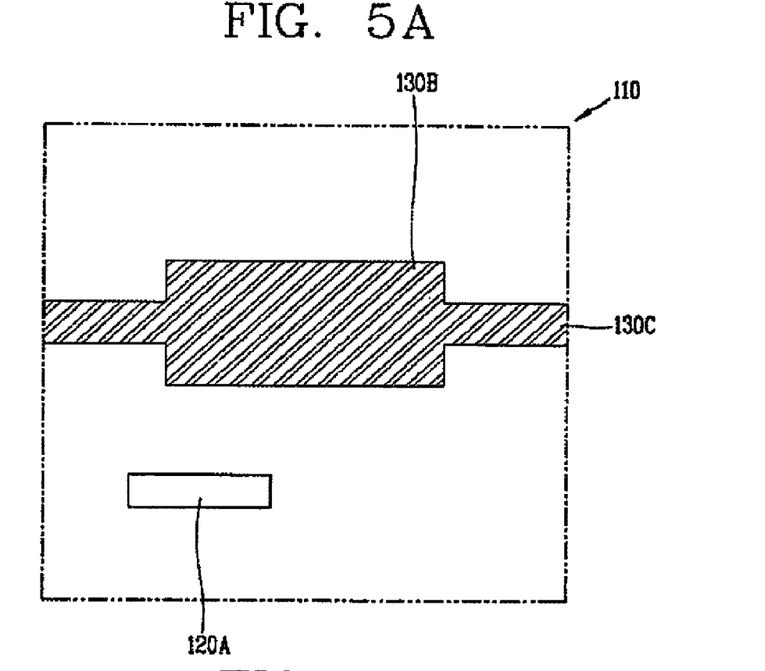
FIGS. 5A to 5D are plan views showing a process of fabricating the LCD device of FIG. 3.

As shown in FIGS. 4A and 5A, a photolithography process (a first mask process) is used to form the first active pattern 120A on the substrate 110. The first active pattern 120A and a second active pattern 1208 are simultaneously formed to, respectively, be used as the channel layer and to form a base for the storage wirings (i.e., the first storage electrode 130B and the storage line 130C). The substrate 110 is made from a transparent insulation material such as glass.

The storage wirings 130B (first storage electrode) and 130C (storage line) may be simultaneously formed by applying a slit mask or a half-tone mask when the active patterns 120A and 120B are formed. At this time, no additional mask process may be needed. FIGS. 6A to 6D are sectional views showing a slit mask process.

Figure 6A:
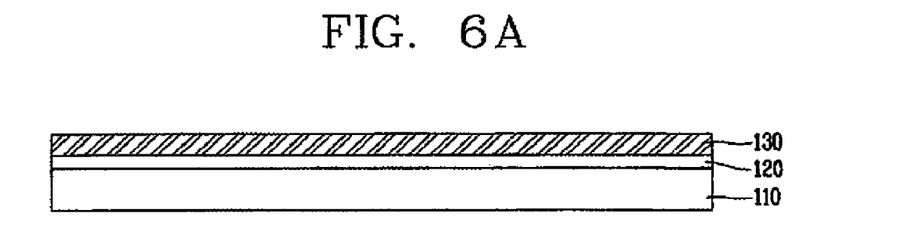
FIGS. 6A to 6D are cross sectional views showing a slit mask process.

In FIG. 6A, a silicon layer 120 is formed on the substrate 110 made of the transparent insulation material such as glass. The silicon layer 120 is used as a channel layer. Although not shown, a buffer layer such as a silicon oxide film ($SiO_2$) may be formed on the substrate 110 on which the silicon layer 120 may be formed. The buffer layer may prevent infiltration of dopants such as natrium (Na) existing in the glass substrate 110 into an upper layer during this fabrication process.

The silicon layer 120 is formed from a crystallized silicon thin film. Alternatively, or additionally, the TFT may be formed from an amorphous silicon film. The polycrystalline silicon thin film may be formed by depositing the amorphous silicon thin film on the substrate 110 and applying various crystallization processes, which will be described below.

The amorphous silicon thin film may be deposited through various methods. For example, a low pressure chemical vapor deposition (LPCVD) and/or a plasma enhanced chemical vapor deposition (PECVD) may be used.

The storage wirings 130B (first storage electrode) and 130C (storage line) may be simultaneously formed by applying a slit mask or a half-tone mask when the active patterns 120A and 120B are formed. At this time, no additional mask process may be needed. FIGS. 6A to 6D are sectional views showing a slit mask process.

The SLS is based on a principle that grains grow in a vertical direction at the interface of liquid phase silicon and solid phase silicon. By making grains grow a certain length laterally, the size of silicon grains may be enhanced. For this purpose, a laser energy and a laser beam irradiation range may be controlled.

Thereafter, a first conductive film 130 is formed on the polycrystalline silicon layer 120. The first conductive film 130 is used to form the storage wiring. The first conductive film 130 may be made from metal material such as aluminum (Al), an aluminum alloy, tungsten (W), copper (Cu), chromium (Cr) or molybdenum (Mo).

Figure 6B:
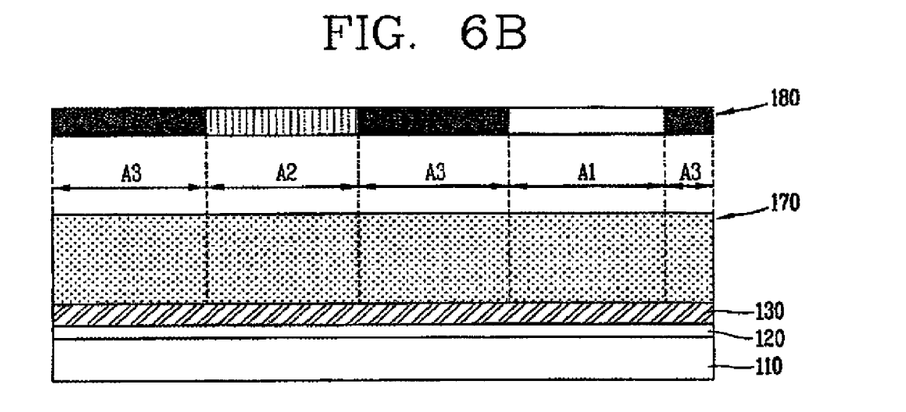

As shown in FIG. 6B, a photosensitive film 170 made from a photosensitive material such as a photoresist is formed on the substrate 110 on which the silicon layer 120 and the first conductive film 130 have been sequentially formed. Subsequently, light is selectively irradiated onto the photosensitive film 170 though a slit mask 180.

The slit mask 180 includes a complete transmission region A1 which transmits light wholly, a slit region A2 having a slit pattern for transmitting a portion of light, and a blocking region A3 which blocks irradiated light. The light is irradiated onto the photosensitive film 170 only after it has transmitted through the slit mask 180.

Figure 6C:
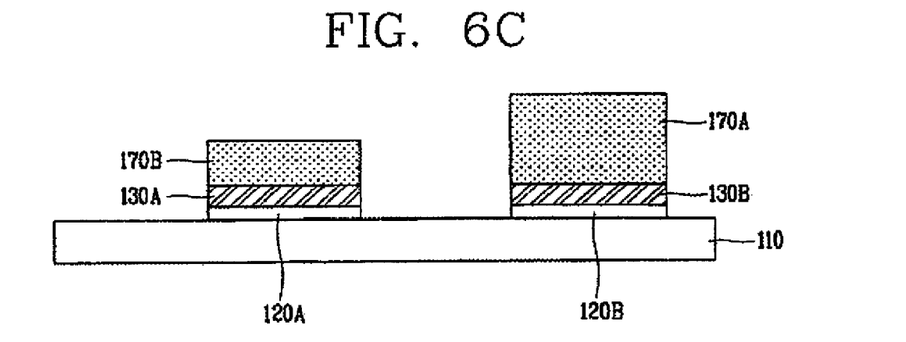

Subsequently, when the photosensitive film 170 exposed through the slit mask 180 is developed as shown in FIG. 6C, each of the photosensitive film patterns 170A and 170B with a certain thickness remain at regions where light has been wholly and partially transmitted through the complete transmission region Al and the slit region A2. The photosensitive film 170 is completely removed from the blocking region A3 where light has been blocked, thereby exposing the surface of the first conductive film 130.

The second photosensitive film pattern 170B formed through the slit region A2 is formed thinner than the first photosensitive film pattern 170A formed at the complete transmission region A1. As noted above, the photosensitive film 170 which is positioned at the blocking region A3 is completely removed as light is blocked. This is because a negative photoresist is used. In another embodiment, a positive photoresist may be available.

The first conductive film 130 and the silicon layer 120 are selectively removed by using the first photosensitive film pattern 170A and the second photosensitive film pattern 170B as a mask. The first and second active patterns 120A and 120B, and the first storage electrode 130B, are patterned to be formed on the array substrate 110. At this time, the first conductive film pattern 130A remains as it has been patterned in the same form on the first active pattern 120A, and the first storage electrode 130B remains as it has been patterned in the same form on the second active pattern 120B. The first conductive film pattern 130A may be removed through an ashing process and an etching process.

Figure 6D:
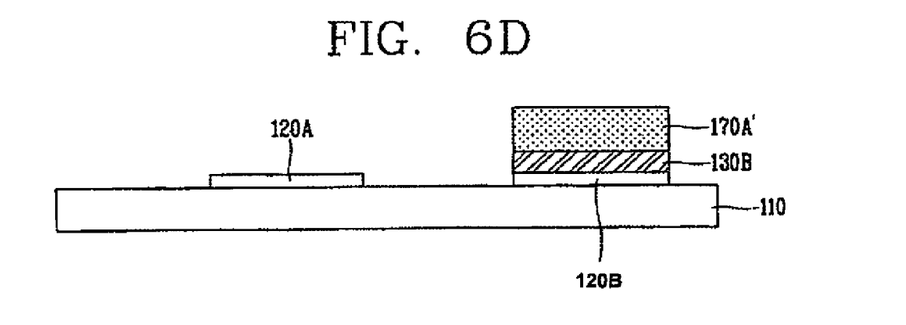

When the ashing process is performed to remove a portion of the photosensitive film patterns 170A and 170B as shown in FIG. 6D, the second photosensitive film pattern 170B, positioned at an upper side of the first active pattern 120A, within slit region A2, is completely removed to expose the surface of the first conductive film pattern 130A.

The first photosensitive film pattern 170A is partially removed such that its thickness is as thick as that of the second photosensitive film pattern 170B. FIG. 6D illustrates a third photosensitive film pattern 170A'as a result of the partial removal of the first photosensitive film pattern 170A. The third photosensitive film pattern 170A' is disposed on the first storage electrode 130B corresponding to the complete transmission region A1. The first conductive film pattern 130A positioned on the first active pattern 120A is selectively removed by using the third photosensitive film pattern 170A' to prevent removal of the first storage electrode 130B.

As a result of removing the third photosensitive film pattern 170A'positioned on the first storage electrode 130B, the first active pattern 120A is formed as a polycrystalline silicon layer and the first storage electrode 130B is formed as the first conductive film, on the substrate 110. Referring also to FIGS. 4A and 5A, the first active pattern 120A and the storage wirings 130B and 130C may be simultaneously formed through the single photolithography process (the first mask process) by using the slit mask.

The storage wirings 130B and 130C may be formed as low resistance metal layers, so that it may be applied to a line inversion driving system requesting a low resistance. Alternatively, or additionally, the storage wirings 130B and 130C may be applied to a dot inversion driving system.

Figure 4B:
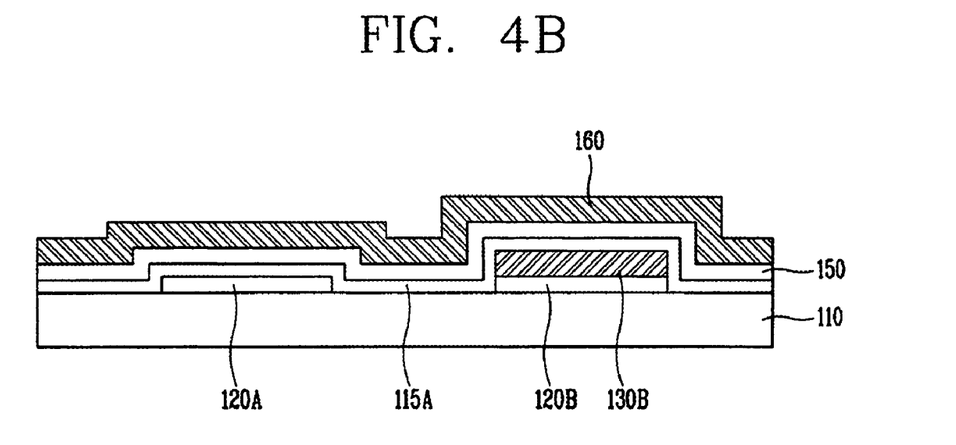

As shown in FIG. 4B, a first insulation film 115A, a second conductive film 150 and a third conductive film 160 are sequentially formed on the entire surface of the substrate 110. The second conductive film 150 is made of a transparent conductive material with excellent transmittance such as indium tin oxide (ITO) or indium zinc oxide (IZO) for forming the pixel electrode. The third conductive film 160 is made of a low-resistance opaque conductive material such as aluminum, an aluminum alloy, tungsten, copper, chromium, molybdenum, etc. for forming the gate electrode and the gate line.

Figure 4C:
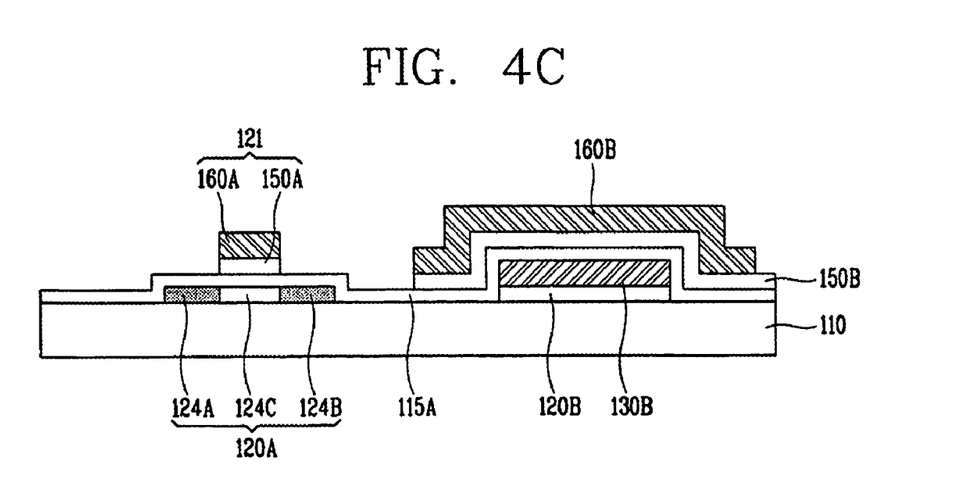
Figure 5B:
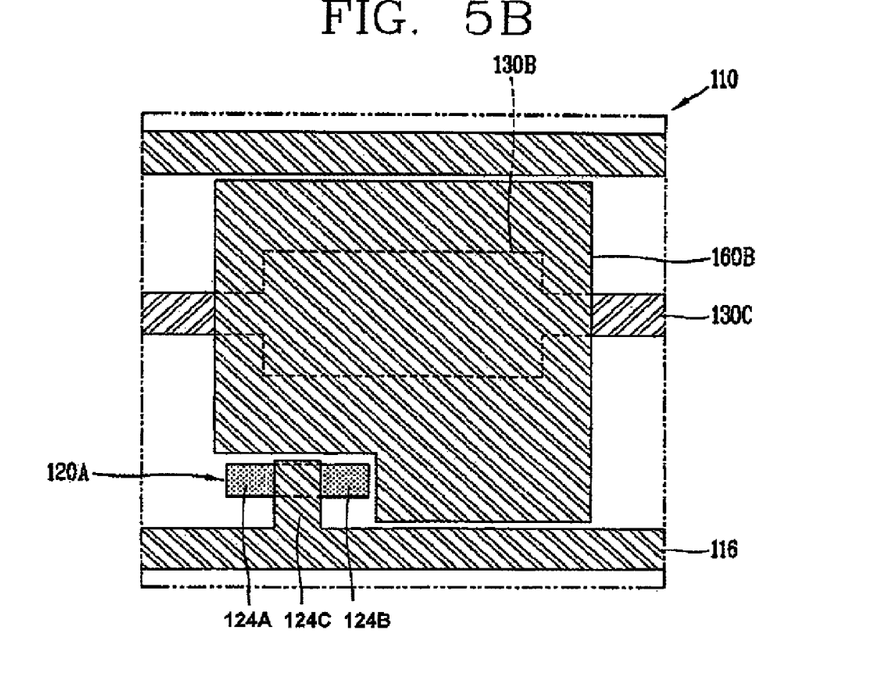

As shown in FIGS. 4C and 5B, the second conductive film 150 and the third conductive film 160 are selectively patterned by using the photolithography process (a second mask process) in order to form the gate electrode 121, the gate line 116 and the pixel electrode 150B. The gate electrode 121 includes a first gate electrode pattern 150A formed as the transparent second conductive film and a second gate electrode pattern 160A formed as the opaque third conductive film. A pixel electrode pattern 160B is formed as the opaque third conductive film with the same form as the pixel electrode 150B and it remains on the pixel electrode 150B formed as the transparent second conductive film.

A dopant such as an impurity ion is injected into a certain region of the first active pattern 120A by using the gate electrode 121 as a mask to form a source region 124A and a drain region 124B. The source region 124A and the drain region 124B become ohmic contract layers. The gate electrode 121 serves as an ion stopper preventing infiltration of the dopant into the channel region 124C of the first active pattern 120A.

Electrical characteristics of the first active pattern 120A may change according to a type of the injected dopant. When the injected dopant is a group 3 element such as boron (B), the TFT operates as a P-type TFT. When the injected dopant is a group 5 element such as phosphor (P), the TFT operates as an N-type TFT.

Figure 4D:
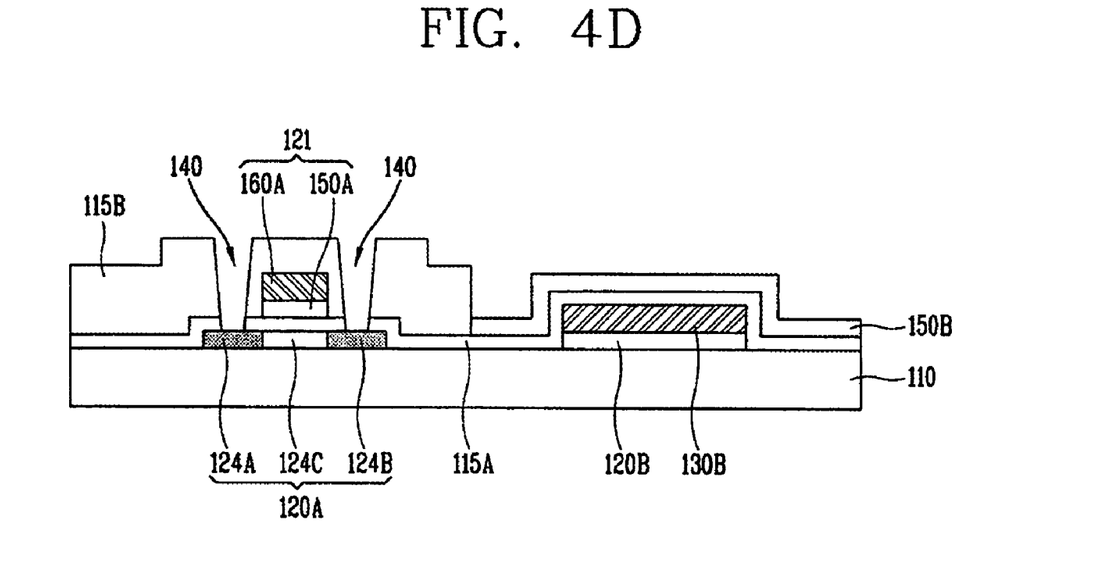
Figure 5C:
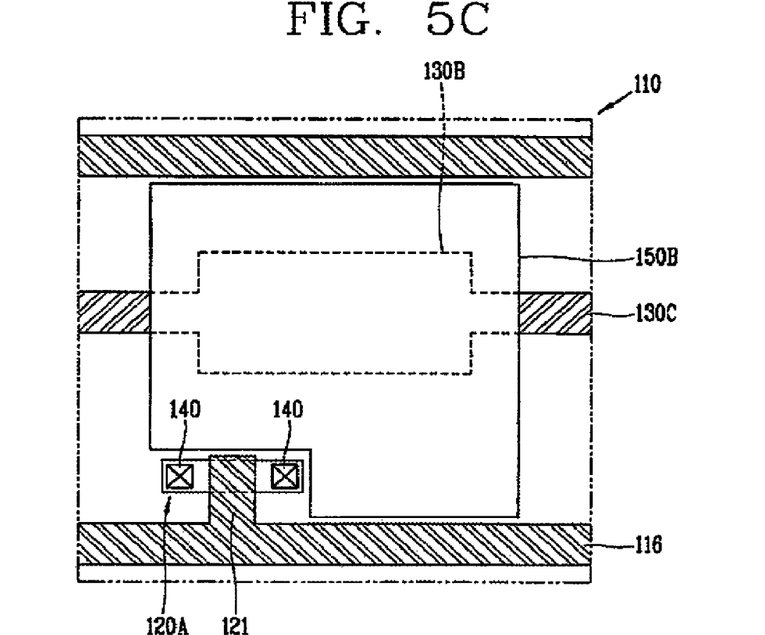

After the ion-injection process, a process for activating the injected dopant may be performed. As shown in FIGS. 4D and 5C, a second insulation film 115B is deposited on the entire surface of the substrate 110 including the gate electrode 121 and the pixel electrode 150B. Portions of the first insulation film 115A and the second insulation film 115B are removed to form a contact hole 140 for electrical connection between the source/drain regions 124A and 124B and the source/drain electrodes.

At this time, the second insulation film 115B formed over the pixel electrode 150B is removed by using the same mask as the mask which has been used to form the pixel electrode 150B formed at the pixel region. As a result, the pixel electrode pattern 160B made of the third conductive metal is exposed. The second insulation film 115B may be made of a transparent organic insulation material such as benzocyclobutene (BCB). Alternatively, or additionally, an acrylic resin may be used to obtain a high aperture ratio.

The pixel electrode pattern 160B (FIG. 4C) remaining on the pixel electrode 150B is removed to expose the pixel electrode 150B made of the transparent second conductive metal. The second conductive metal is etched without using a mask in the course of forming the second insulation film 115B.

Figure 4E:
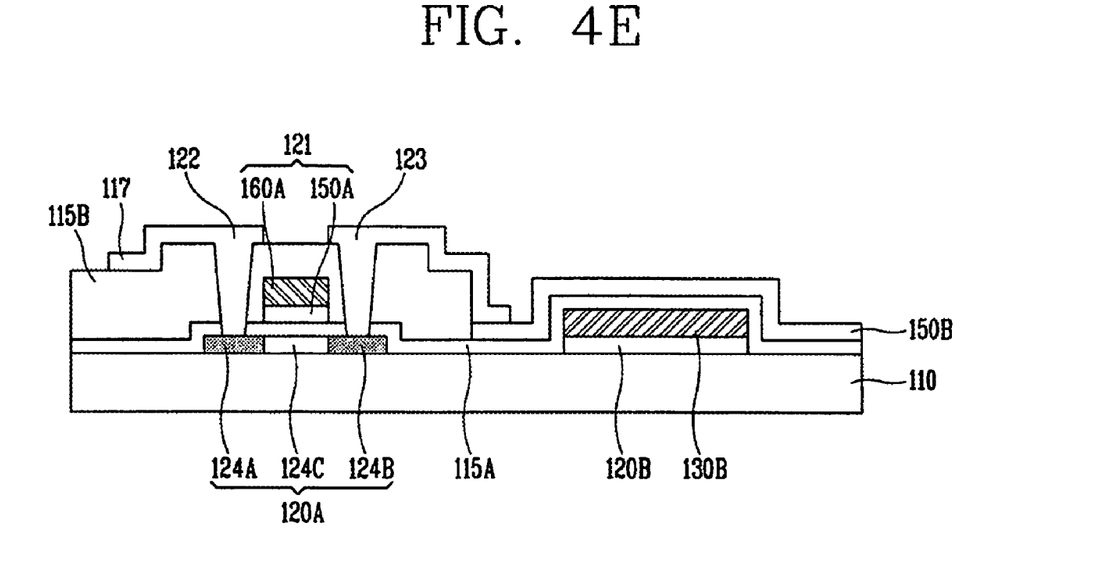
Figure 5D:
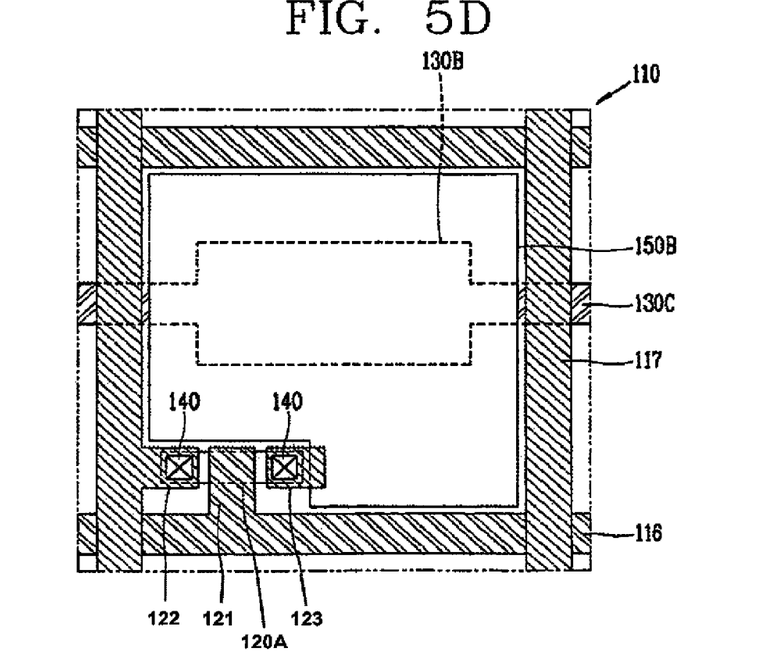

As shown in FIGS. 4E and 5D, a fourth conductive metal material is deposited on the substrate 110 and then patterned by using the photolithography process (a fourth mask process) to form the source electrode 122 and the drain electrode 123. The source electrode 122 is connected with the source region 124A and the drain electrode 123 is connected with the drain region 124B through the contact hole 140.

A portion of the source electrode 122 extends to form the data line 117 and a portion of the drain electrode 123 extends toward the pixel region so as to be electrically connected with the pixel electrode 150B.

A portion of the pixel electrode 150B overlaps above the first storage electrode 130B. A storage capacitor is formed with the first insulation film 115A interposed therebetween. Because the first insulation film 115A is relatively thin, a sufficient capacitance may be obtained.

The process for fabricating the LCD device has many advantages. For example, because the gate electrode and the pixel electrode are simultaneously patterned and a process for forming the contact hole is reduced, two iterations of the mask process are eliminated. Accordingly, a production yield may increase and a fabrication cost may be reduced. Further, the first storage electrode for capacitance is made of conductive material by using the slit mask when the active pattern is formed. As a result, a sufficient capacitance may be obtained without an additional mask process. The first storage electrode and the storage line are made of low-resistance conductive material, so it may be applied to a line inversion driving system which requests a low resistance.

It will be apparent to those skilled in the art that various modifications and variations may be made without departing from the spirit or scope of the invention. Thus, it is intended that the invention cover the modifications and variations provided they come within the scope of the appended claims and their equivalents.

What is claimed is:

1. A method for fabricating an LCD comprising:
providing a substrate having a first region and a second region;
forming a storage line and a first storage electrode in the first region and an active pattern in the second region of the substrate using a single first mask,
wherein the active pattern is formed as a silicon layer and the storage line and the first storage electrode are formed as a low-resistance first conductive film and
wherein the storage line and the first storage electrode are disposed on a silicon pattern and connected to the silicon pattern, and the silicon pattern is isolated from the active pattern;
forming a first insulation film, a second conductive film and a third conductive film on the substrate,
wherein the second conductive film is made of a transparent conductive material and the third conductive film is made of a low-resistance opaque conductive material;
simultaneously forming a gate electrode and a pixel electrode on the substrate by patterning the second conductive film and the third conductive film using a single second mask,
wherein the first storage electrode on the silicon pattern overlaps with a portion of the pixel electrode to form a storage capacitor with the first insulation film interposed therebetween and
wherein a pixel electrode pattern formed the third conductive film remains on the pixel electrode formed the second conductive film;
forming a source region and a drain region by injecting an impurity ion by using the gate electrode as a mask;
forming a second insulation film on the substrate;
simultaneously forming a first contact hole and a second contact hole by removing the first insulation film and the second insulation film and exposing the pixel electrode pattern by removing the second insulation film using a single third mask;
removing the pixel electrode pattern remaining over the silicon pattern and the first storage electrode and on the pixel electrode to expose the pixel electrode using the third mask; and
forming a source electrode and a drain electrode using a fourth mask, the source electrode connected to a source region via the first contact hole and the drain electrode connected to a drain region through the second contact hole.

2. The method of claim 1, wherein forming the storage line and the active pattern comprises:
forming a silicon layer on the substrate;
forming a first conductive film on the silicon layer; and
forming a photosensitive film pattern on the first conductive film.

3. The method of claim 2, further comprising:
irradiating light onto the photosensitive film pattern via a slit mask; and
developing the photosensitive film pattern into a first photosensitive film pattern and a second photosensitive film pattern, wherein the first photosensitive film pattern has a first thickness in the first region and the second photosensitive film pattern has a second thickness in the second region.

4. The method of claim 3, further comprising forming the slit mask to comprise a first transmission region, a second transmission region, and a blocking region.

5. The method of claim 3, wherein forming the storage line and the active pattern further comprises removing the first conductive film in the second region and selectively removing the silicon layer by using the first and second photosensitive film patterns as a mask.

6. The method of claim 3, wherein forming the active pattern and the storage line further comprises:
removing the second photosensitive film pattern;
partially removing the first photosensitive film pattern to produce a third photosensitive film pattern having a third thickness of the remaining first photosensitive film pattern; and
removing the first conductive film remaining on the active pattern using the third photosensitive film pattern as a mask.

7. The method of claim 6, wherein removing the first photosensitive film pattern and removing the second photosensitive film pattern are substantially simultaneously performed.

8. The method of claim 6, further comprising:
patterning the first photosensitive film pattern to have the same thickness as that of the second photosensitive film pattern with an ashing process.

9. The method of claim 6, further comprising substantially entirely removing the second photosensitive film pattern by an ashing process.

10. The method of claim 4, further comprising exposing a negative type photosensitive film to light wherein the first transmission region of the slit mask is applied to the first region and the second transmission region is applied to the second region.

11. The method of claim 4, further comprising exposing a positive type photosensitive film to light wherein the blocking region of the slit mask is applied to the first region and the second transmission region is applied to the second region.

12. The method of claim 4, further comprising forming the slit mask to have a slit pattern such that the second photosensitive film pattern with the second thickness is thinner than the first thickness.

13. The method of claim 1, further comprising extending a portion of the drain electrode toward the pixel electrode so as to be electrically connected to the pixel electrode.

* * * * *